United States Patent [19]

Lowe

[11] 4,297,728
[45] Oct. 27, 1981

[54] CHARGED COUPLED DEVICE TIME BASE CORRECTOR SYSTEM

[76] Inventor: Virgil L. Lowe, 1411 Noble Forest Dr., Norcross, Ga. 30092

[21] Appl. No.: 27,926

[22] Filed: Apr. 6, 1979

[51] Int. Cl.³ .................. H04N 5/04; H04N 5/785
[52] U.S. Cl. .................................. 360/36; 358/127
[58] Field of Search ............... 360/36; 358/8, 148, 358/127

[56] References Cited

U.S. PATENT DOCUMENTS

| | | | |
|---|---|---|---|
| 3,580,991 | 5/1971 | Krause | 360/36 X |
| 3,758,711 | 9/1973 | Crosno | 360/36 |
| 4,005,476 | 1/1977 | Dickopp et al. | 360/36 |
| 4,028,729 | 6/1977 | Browder | 360/36 X |
| 4,074,307 | 2/1978 | Dischert et al. | 358/8 |
| 4,133,009 | 1/1979 | Kittler et al. | 360/36 X |
| 4,150,395 | 4/1979 | Pritchard | 358/8 |

FOREIGN PATENT DOCUMENTS 2361563  6/1975  Fed. Rep. of Germany ........ 360/36

Primary Examiner—John H. Wolfe
Assistant Examiner—Donald McElhery
Attorney, Agent, or Firm—Newton, Hopkins & Ormsby

[57] ABSTRACT

An improved charged coupled device time base corrector system to compensate for a change in the phase or frequency of input video signals, as occurs in the playback of a video tape recorder, by changing the nominal delay through the corrector, comprising, in combination, an input feedback circuit and an output feedback circuit. The input feedback circuit includes two cascaded infinite gain circuits, an infinite gain phase detector followed by an infinite gain voltage amplifier which gives an error voltage that controls the frequency of the voltage controlled oscillator (VCO) utilized to control the system delay. The output servo loop always adapts itself to the input error voltage. The VCO is thereby driven at a rate of change of its frequency proportional to the incoming error signal.

6 Claims, 4 Drawing Figures

CHARGED COUPLED DEVICE TIME BASE CORRECTOR SYSTEM

SUMMARY OF THE INVENTION

The present invention removes unwanted variations in the time of occurence of video signals from a helical scan tape recorder. Such variations commonly result from variation in the tape-to-head speed. To correct such errors, the video signals entering the present Time Base Corrector system (TBC) are stored in memory, providing a nominal 1H of delay (where H is the time for one horizontal line). The delay, however, is variable, to compensate for differences in the time of arrival of the video signals, and the signals leave the TBC at the correct relative time.

The delay mechanism for storing video in the device is the Fairchild analog memory CCD-321. This is a charge-coupled device (CCD) and has two groups of 455 analog charge storage cells. The amount of charge stored in a given cell represents the amplitude of the video signal at a given instant. The rate at which the charge units are shifted from one cell to the next, in the serial chain of 455, is determined by the frequency of an applied clock. If the incoming video is late, this is sensed by the Time Base Phase Comparator and the clock frequency increases to decrease the delay; if the incoming video is early, the clock frequency is decreased to increase the delay. This compensates for incoming time base errors and gives a stable time base output.

The delay of the CCD may be varied from 0.5H to 1.5H, which gives a time base correction window of 1H (1.5H-0.5H). This 1H window is centered on the average time-base of the incoming video, and is controlled by a reference oscillator which slowly follows the average timing of the incoming video. Although the output video has a very slow time base variation, it can be followed easily by most standard TV equipment.

This time base corrector requires feedback circuits not previously used in the prior art of time base correctors. The phase detector must be of the infinite gain type and may be of the conventional type of ramp and sample which gives a voltage representing the phase error followed by a slew rate controlled infinite gain or high gain voltage amplifier or a less conventional infinite gain phase detector which is an infinite gain phase detector without the use of an additional voltage amplifier.

The infinite gain phase detector must be followed by another infinite gain voltage amplifier which gives an error voltage that controls the frequency of the VCO used to control system delay.

The two cascaded infinite gain circuits are required in the present system because the voltage that normally controls frequency lock in a conventional time base corrector controls only the frequency of the VCO which controls the delay through the system and, therefore, only controls the phase of the system. This would give a residual phase error if the second infinite gain circuit were not used. When it is used, a frequency error of the input signal gives a constant voltage out of the infinite gain phase detector; the magnitude of the voltage represents the magnitude of the frequency error of the input signal. The second infinite gain voltage amplifier then gives a changing voltage at its output, the rate of change representing the frequency error of the input signal. In this way, the VCO is driven at a rate of change of its frequency proportional to the incoming error signal.

The present time base corrector also uses a unique output feedback circuit to serve as a reference for correction for the input feedback circuit previously described. Prior art output feedback circuits required a long time constant circuit which followed the long term variations of the input signal time base error but rejected the short term variations. The purpose of those prior circuits was to provide a semi-stable time base correction reference so the output signal could have short term errors removed but track long term errors so the time base correction range would not be exceeded. They required multiple ranges to lock up quickly with circuits for determining when to shift to a short time constant for fast lock or relock and then to switch back to a long term constant for a more stable reference.

The present ccd time base corrector has a more simplified circuit in the number of parts required but exceeds the operation of previous output feedback circuits in the following ways:

1. Fast lock up time due to adaptive time constant which decreases the R component of an RC circuit.
2. Adaptive rate of tracking that changes due to the magnitude of the input error so the output circuit follows quickly if the input error tries to exceed the range of correction.
3. Follows slowly if errors are small giving the most stable output possible under all circumstances of input error.

The output feedback circuit is a network of resistors and diodes that dynamically controls the input impedance of an operational amplifier. The capacitive component of the network is constant and connected as part of the negative feedback of the operational amplifier. The time constant of the circuit is determined by the product of the input impedance and the capacitance in the feedback of the operational amplifier. The time constant is varying proportionally with the input impedance which, in turn, varies proportionally with the input error. Thus, the output feedback circuit always adapts itself to the input error voltage.

DETAILED DESCRIPTION OF THE PREFERRED EMBODIMENT

Figure 1:
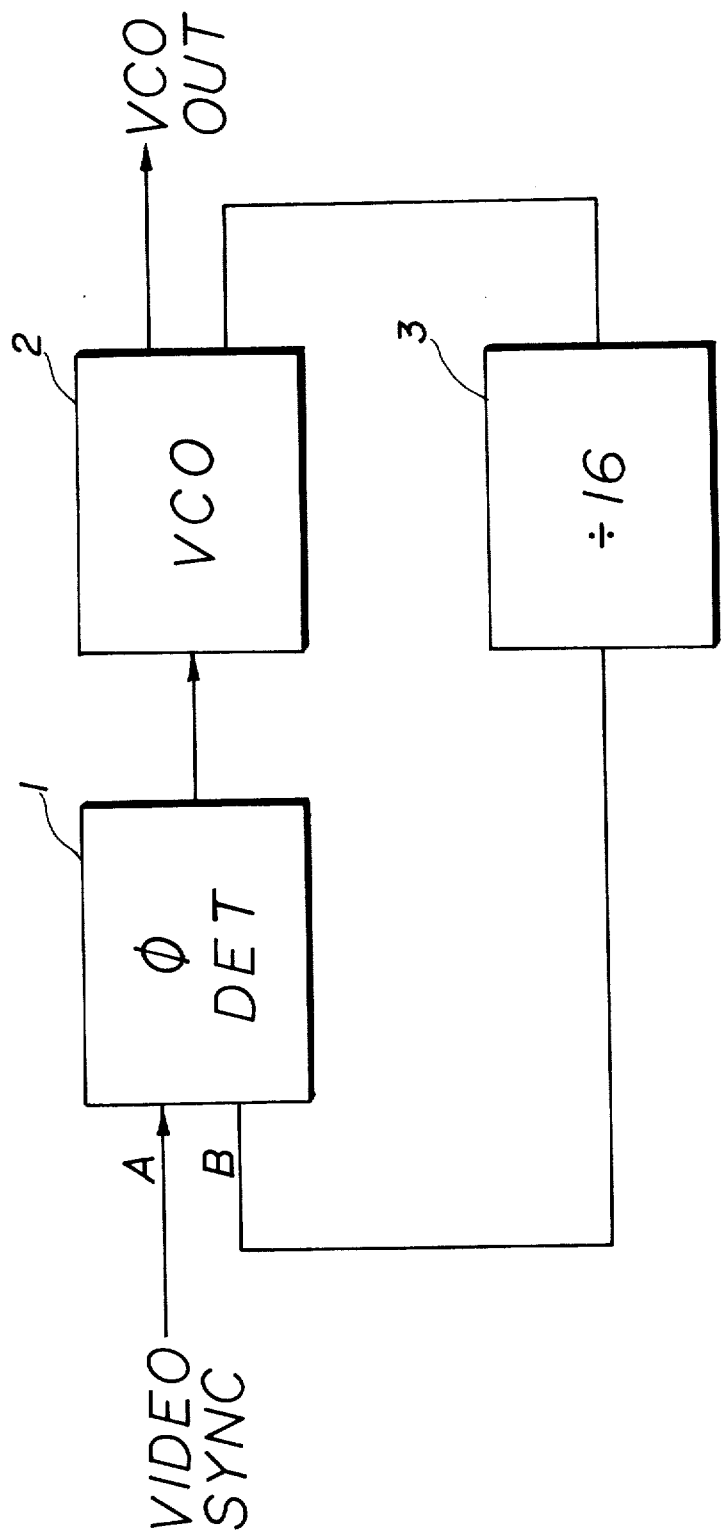
FIG. 1 is a schematic block diagram of a prior art time base corrector circuit.

The first circuit of the present invention uses an infinite gain phase detector in which the error voltage, which represents the phase error of a feedback circuit, continues to increase until it reaches the saturation limit of the circuit, and a following infinite gain voltage amplifier. The rate of change of the voltage is determined by the magnitude of the phase error and is bi-directional, charging in the positive direction for a leading error and the negative direction for a lagging error. FIG. 1 represents the conventional class 2 feedback circuit when the phase detector 1 has infinite or very high gain. This feedback circuit is normally enough to phase lock and frequency lock the servoed oscillator 2 to the phase and 16x the frequency of the input signal. The frequency lock is desirable because without it the feedback circuit always sees a constant phase error from sample to sample of the phase detector. For example, let us assume the circuit is constructed so that it has limits of 0 volts on the low side and +5 volts on the high side and normally operates at 2.5 volts center line voltage. The frequency of the VCO 2 is determined by the voltage applied to it. Therefore, the operation of the phase detector 1 would cause it to increase or decrease in voltage until the VCO output at Point B is both frequency and phase locked to the input signal at Point A, as shown in FIG. 1. The servo action created by the circuit will cause the VCO to track the input signal as its phase and/or frequency change.

The above system is currently used to phase lock VCO for various uses including some video time base correctors. However, this approach is not sufficient to maintain a phase lock as the frequency varies when it is used in a video time base corrector using continuous clocking mode of a charged coupled device (ccd) time base corrector.

Figure 2:
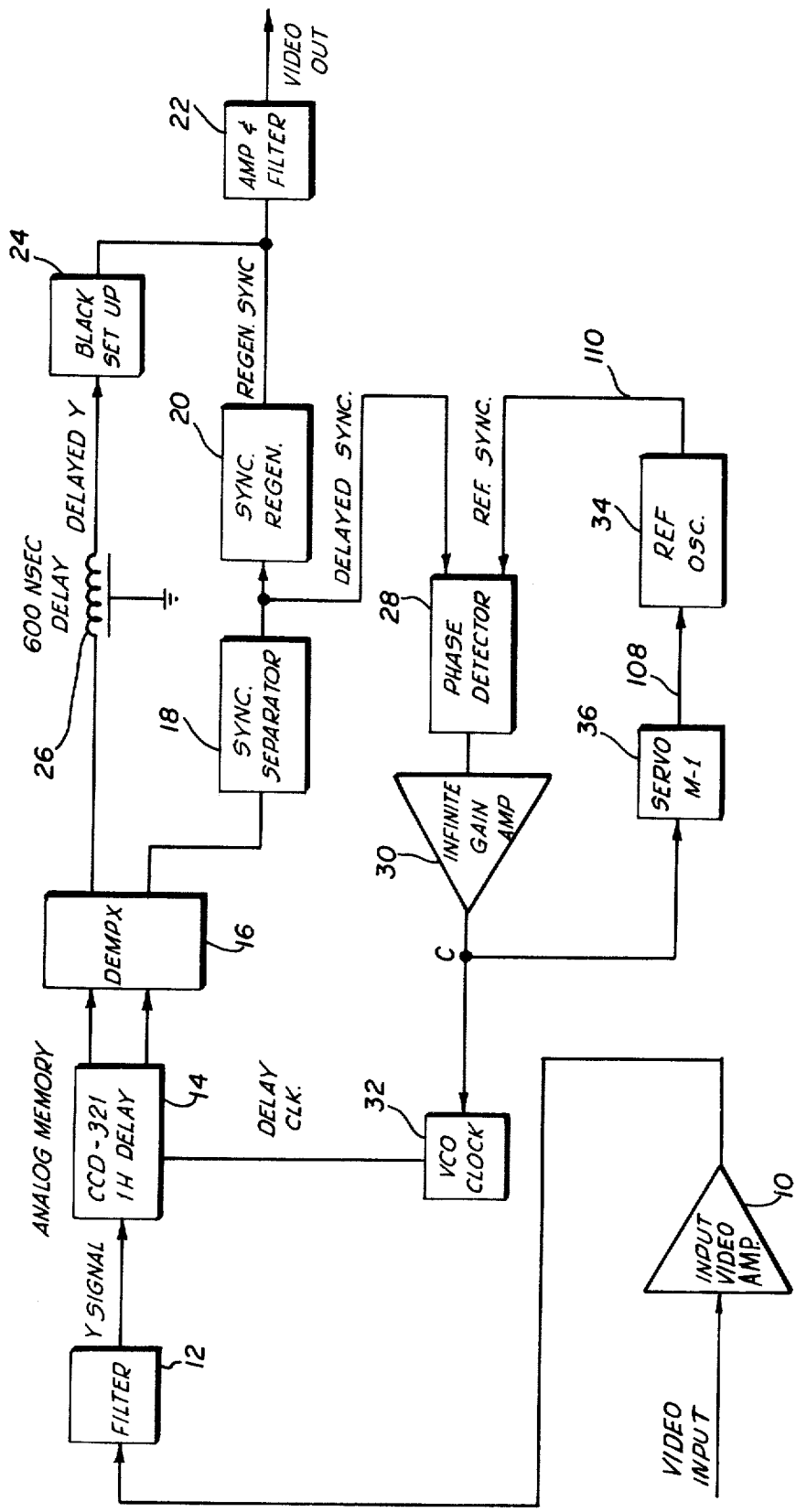
FIG. 2 is a schematic block diagram of the present invention.

Referring to FIG. 2, the basic operation of a video time base corrector using a ccd 14 in the continuous clocking mode is to compensate for a change in the phase or frequency of the input video signals, as occurs in the playback of a video tape recorder, by changing the nominal delay through the time base corrector. This change in delay occurs as a result of changing the clocking rate of the signals through the ccd. The ccd currently used has two parallel registers of analog storage cells connected as first-in first-out shift registers. Each of the two registers contains 455 cells. A multiplexer is used alternately to shift the sampled video signal every other clocking period so that the full 910 cells (455×2) are used with each of the two channels operating at one half of the total clocking rate.

The nominal clocking rate of the ccd memory is 14.318 MHz, or a period of $\approx 69.78$ nanoseconds, giving a nominal delay of $\approx 63.5$ microseconds $(910 \times 69.78 \times 10^{-9} \text{ sec.} = 63.5 \times 10^{-6} \text{ sec.})$. This represents the time requirement to trace one horizontal line of information in the United States television standards (NTSC). The voltage control oscillator 32 can change its frequency and therefore the clocking rate from 9.5 MHz to 28 MHz giving a correction range of $\pm \frac{1}{2}$ Horizontal line or a 63.5 microsecond range.

As the video signal at the input comes sooner, the phase detector 28 produces a voltage that represents the error and causes the VCO 32 to decrease the clocking rate so the delay through the ccd 14 is longer, thereby compensating for the error so the timing of the singal at the output is held constant. If the input video signal comes later, the delay is decreased by increasing the frequency of the VCO. The VCO always requires a voltage at its input to represent its frequency. Therefore, if the feedback circuit represented in FIG. 1 were used a phase error would have to exist to create this voltage.

Figure 3:
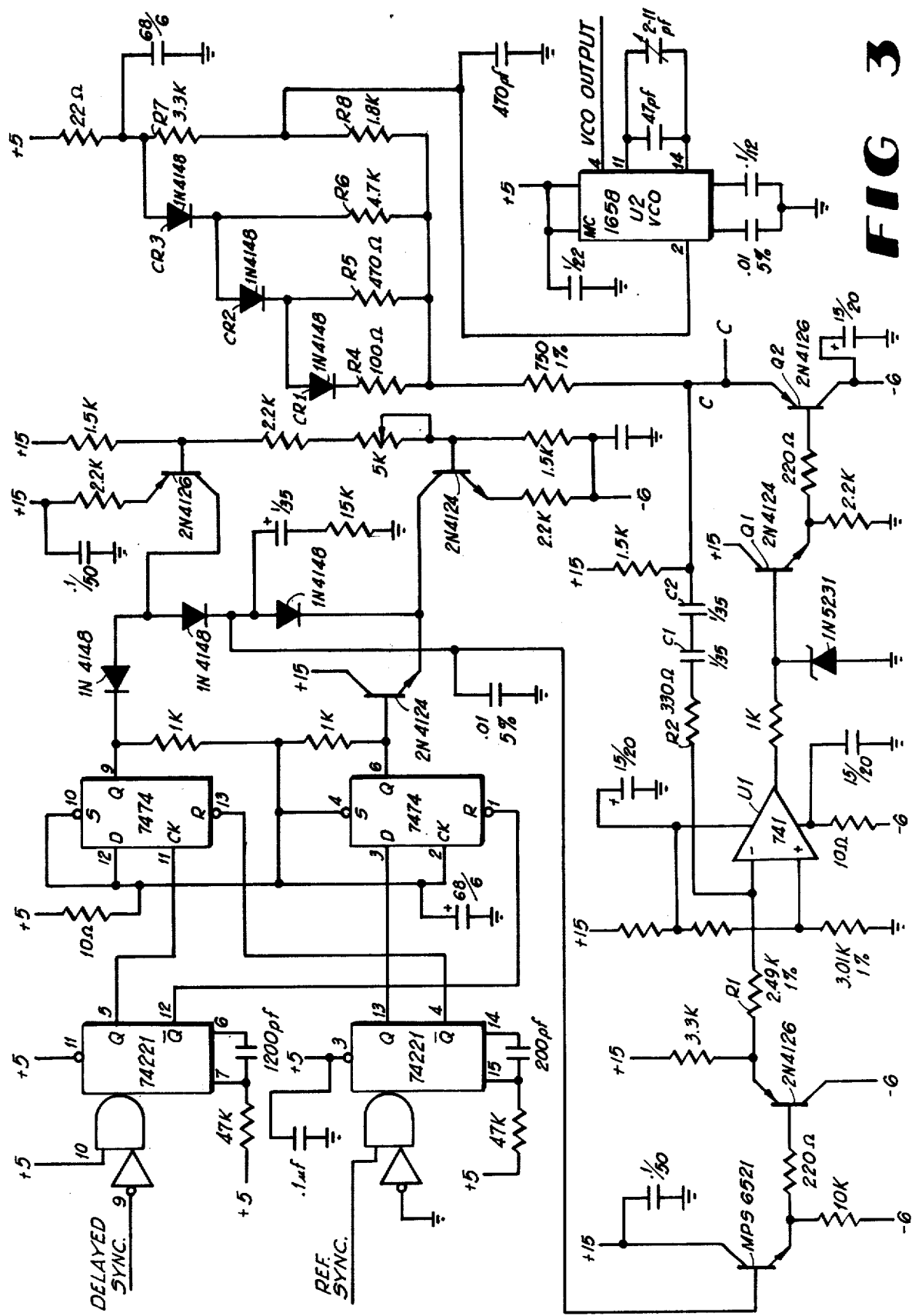
FIG. 3 is a detailed diagram of the circuitry of the input feedback circuit of the present invention.

A more exact operation of this type of time base corrector can be achieved by including an infinite gain amplifier 30 after the infinite gain phase detector 28 as shown in FIG. 2. FIG. 3 shows the actual circuit used to give the necessary controlled slew rate and feedback circuit damping required by the system.

In the overall system operation in FIG. 2, the video sync is stripped from the composite video signal by sync separator 18 after the video has passed through the ccd delay device. This delayed sync signal is one of the inputs to the pahse detector 28. The second input to the phase detector is the REF sync which is controlled by a third long time constant network and amplifier in servo MODULE M-1 denoted by reference number 36. The REF sync in this system represents the long-term frequency error of the input signal so that this particular product can constantly adapt to non-servoed video tape recorders; however, in other products already developed by the inventor the REF sync signal is derived from the system sync in a TV station or small studio so that servo-locked video tape recorders can be timed precisely to the studio reference sync timing.

The phase detector 28 produces a voltage that represents the phase error of the delayed sync compared to the ref sync. This voltage, when higher than 2.5 volts, causes a fall in the voltage out of the operational amplifier U1, shown in FIG. 3, which is connected as an infinite gain amplifier. The U1 output voltage is slew-rate controlled by resistor R1 and capacitors C1 and C2 which help control the feedback gain and response time. Resistor R2 is used to allow some immediate response to an input error and provides damping to the feedback to control overshoot and prevent oscillation of the feedback. The output of the infinite gain amplifier U1 is buffered through transistors Q1 and Q2 and fed to a resistor and diode network consisting of CR1, CR2, CR3, and resistors R4, R5, R6, R7 and R8. The purpose of this network is to make the control voltage to the VCO-U2 non-linear so that the delay through the system is linear when compared to the voltage at Point C.

Figure 4:
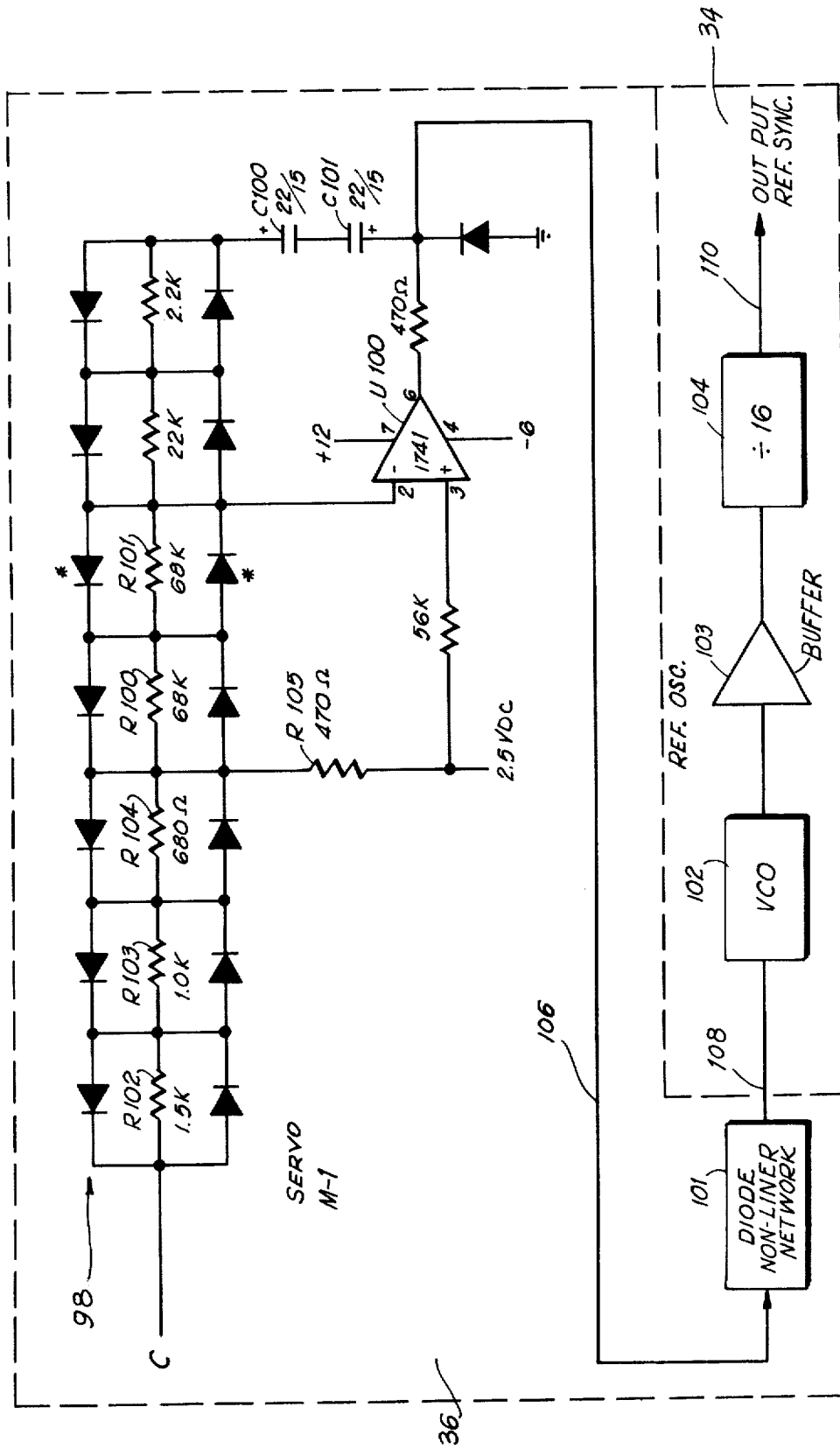
FIG. 4 is a detailed diagram of the circuitry of the output feedback circuit of the present invention.

The output feedback circuit is comprised of the unique feedback network shown in FIG. 4, a non-linear diode network 101, a voltage controlled oscillator (VCO#2) 102, a buffer amplifier 103 and a divider integrated circuit 104. The input to the output feedback circuit Point C on the input servo loop in FIG. 3. This voltage represents the error voltage required to correct the time base error of the input signal and also represents the instantaneous positional error relative to the correction range of the time base corrector. This voltage controls the input impedance of the operational amplifier U100 and the input voltage by causing one or more of the diodes in its input circuit 98 to turn on resulting in an adaptive voltage divider.

As a diode starts to conduct, its forward impedance drops from near infinity with no current to only a few ohms when it is in hard conduction of 1 to 10 milliamps. As the input error voltage rises above or below the center voltage of 2.5 volts, more diodes turn on shunting more of the resistors with a lower impedance. This causes a larger portion of the input error voltage to be transferred to the resistor R100 which in turn causes the capacitors C100 and C101 to charge faster, giving an increasing rate of change in the output voltage from U100. Fast lock up of the output feedback circuit occurs when the input error voltage is at the limits of +5 volts or 0 volts causing all the diodes in the positive leg or the negative leg of the input diode network 98 to turn on. This causes the two diodes around R100 and R101 to turn on, giving a very low impedance at the input of the operational amplifier. The resulting fast charging of capacitors C100 and C101 causes the output feedback circuit to come up to normal operating voltage very quickly. The time constant is normally 1.5 seconds but the circuit response time is longer because the gain of the circuit is cut by >6:1 ratio by resistor voltage divider R102, R103, R104, and R105. The shunting of these resistors reduces the ratio by which the gain of the circuit is cut until the response time of the output feedback circuit is fast enough to keep the input error from exceeding the correction range of the system.

The output servo error voltage 106 is used to create a non-linear control voltage 108 by non-linear diode network block 101. The non-linear error voltage 108 is then fed to VCO block 102 where it is converted to a frequency. The frequency out of the VCO is buffered in buffer 103 and fed to frequency divider 104 where it is divided down to the horizontal line frequency of the average line frequency of the video input signal. This output 110 then is phase compared to instantaneous phase of the delayed sync derived from the corrected input video signal in FIG. 2.

Both the input feedback circuit in FIG. 2 which is detailed in FIG. 3 and the output feedback circuit in FIG. 2, which is detailed in FIG. 4, work together to produce a time base corrected video output. This method always compares to the delayed sync stripped from the corrected video so the system is a closed circuit comparing over and over again until a precise lock is achieved and then maintained.

What I claim is:

1. An analog video time base corrector system comprising:

input circuit means for receiving a video signal including synchronization information from a source, said input circuit means having an output;

analog delay line means coupled to said output of said input circuit means for delaying said video signal and said included synchronization information, said analog delay line means having first and second outputs;

first feedback circuit means coupled to the first output of said analog delay line means for controlling the delay thereof in response to said delayed synchronization information contained in said delayed video signal, said first feedback circuit means including an infinite gain phase detector means coupled to the first output of said delay line means for comparing the delayed synchronization information contained in said delayed video signal with a reference synchronization signal to detect the phase error in said delayed synchronization information, said phase detector means producing an output signal which is coupled through an infinite gain voltage amplifier to an input of a voltage controlled clock generator means, said clock generator means supplying a clock signal to a clock input of said delay line means, said clock signal having a frequency proportional to the phase error of said delayed synchronization information;

second feedback circuit means coupled to receive the output of said infinite gain voltage amplifier of said first feedback circuit means for supplying said reference synchronization signal to said first feedback circuit means, said second feedback circuit means including an adaptive time constant amplifier means coupled to receive the output of said infinite gain voltage amplifier for automatically controlling the response rate of said second feedback circuit means based upon the phase error of said synchronization information, said second feedback circuit means further including a first voltage controlled oscillator means coupled to receive the output of said adaptive amplifier means for generating said reference synchronization signal; and output circuit means coupled to the second output of said analog delay line means and coupled to receive said delayed synchronization information for interfacing the delayed output of said analog delay line means with circuitry external to said video time base corrector system;

whereby said system acts to slowly correct small phase errors and to rapidly correct large phase errors in synchronization timing such that a stable output video signal is produced for a wide range of input synchronization errors.

2. An analog video time base corrector system as recited in claim 1 wherein:

said first feedback circuit means includes a sync separator circuit means coupled between the first output of said analog delay line means and an input of said phase detector means for separating said synchronization information from said video signal as delayed by said delay line means.

3. An analog video time base corrector system as recited in claim 1 wherein said voltage controlled clock generator means comprises:

non-linear diode and resistor network means coupled to receive the output of said infinite gain voltage amplifier for converting the output of said infinite gain amplifier to a non-linear error signal;

second voltage controlled oscillator means coupled to receive said non-linear error signal output of said non-linear diode and resistor network means for generating said clock signal having a frequency which is proportional to said non-linear error signal.

4. An analog video time base corrector system as recited in claim 1 wherein said adaptive time constant amplifier means comprises:

adaptive voltage divider means coupled to the output of said infinite gain voltage amplifier for dynamically varying the input impedance of said adaptive amplifier means, said adaptive voltage divider network means being controlled by the voltage of the output signal from said infinite gain voltage amplifier; and non-linear diode network means coupled to said adaptive voltage divider means for converting the output of said adaptive voltage divider means to a non-linear error voltage.

5. An analog video time base corrector system as recited in claim 1 wherein said input circuit means comprises:

input video amplifier means coupled to said source of video information for amplifying said video information and said included synchronization information, said input video amplifier means having an output; and filter means coupled to the output of said input video amplifier means for filtering said video information and said included synchronization information.

6. An analog video time base corrector system as recited in claim 1, wherein said analog delay line means comprises:

multiplexer means coupled to receive the output of said input circuit means for alternatingly supplying said video signal including said synchronization information to first and second outputs;

first charge coupled device analog shift register means coupled to the first output of said multiplexer means for delaying said video signal including said synchronization information received from said multiplexer means in response to the clock signal output of said voltage controlled clock generator means, said first analog shift register means having an output;

second charge coupled device analog shift register means coupled to the second output of said multiplexer means for delaying said video signal including said synchronization information received from said multiplexer means in response to the clock signal output of said voltage controlled clock generator means, said second analog shift register means having an output;

demultiplexer means coupled to the outputs of said first and second analog shift register means for controlling the flow of said video signal including said synchronization information through said first and second analog shift register means in conjunction with said multiplexer means.

* * * * *